US012244028B2

(12) United States Patent
Morishita et al.

(10) Patent No.: US 12,244,028 B2
(45) Date of Patent: Mar. 4, 2025

(54) POWER STORAGE DEVICE

(71) Applicant: Prime Planet Energy & Solutions, Inc., Tokyo (JP)

(72) Inventors: Taijyu Morishita, Kasai (JP); Wataru Okada, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 170 days.

(21) Appl. No.: 17/504,511

(22) Filed: Oct. 19, 2021

(65) Prior Publication Data

US 2022/0123405 A1   Apr. 21, 2022

(30) Foreign Application Priority Data

Oct. 20, 2020 (JP) ................................. 2020-175797

(51) Int. Cl.
*H01M 50/209* (2021.01)
*H01M 10/0525* (2010.01)

(52) U.S. Cl.
CPC ..... *H01M 50/209* (2021.01); *H01M 10/0525* (2013.01)

(58) Field of Classification Search
None
See application file for complete search history.

(56) References Cited

U.S. PATENT DOCUMENTS

| 422,504 | A | * | 3/1890 | Currie | ................... | H01M 10/54 |
| | | | | | | 429/49 |
| 9,728,753 | B2 | * | 8/2017 | Chiba | ................. | H01M 10/613 |

| 2006/0068274 | A1 | * | 3/2006 | Lee | ..................... | H01M 50/267 |
| | | | | | | 235/462.43 |
| 2011/0293973 | A1 | | 12/2011 | Kim | | |
| 2012/0028094 | A1 | | 2/2012 | Kim et al. | | |
| 2012/0045686 | A1 | | 2/2012 | Jung | | |
| 2014/0023893 | A1 | | 1/2014 | Shimizu et al. | | |
| 2014/0023906 | A1 | | 1/2014 | Hashimoto et al. | | |
| 2015/0072206 | A1 | * | 3/2015 | Houchin-Miller | ......................... | |
| | | | | | | H01M 10/4257 |
| | | | | | | 429/151 |
| 2015/0104693 | A1 | | 4/2015 | Dorsch | | |
| 2017/0256760 | A1 | | 9/2017 | Nietling et al. | | |
| 2018/0102565 | A1 | * | 4/2018 | Yamamoto | ........ | H01M 10/0472 |
| 2018/0261809 | A1 | | 9/2018 | Choi et al. | | |

(Continued)

FOREIGN PATENT DOCUMENTS

| CN | 102263212 | A | 11/2011 |
| CN | 107112449 | A | 8/2017 |

(Continued)

OTHER PUBLICATIONS

CN108172731A_Machine Translation (Year: 2018).*

*Primary Examiner* — Haroon S. Sheikh
*Assistant Examiner* — Aryana Y. Ortiz
(74) *Attorney, Agent, or Firm* — HAUPTMAN HAM, LLP (57) ABSTRACT

A power storage device includes: a power storage module including a plurality of stacked power storage cells; and a case having an inner space to accommodate the power storage module. The case includes a main body provided with an opening on an electrode terminal side of the plurality of power storage cells, a cover provided over the opening, and a tapered portion that narrows a width of the inner space in a direction from the opening toward a lower side of the main body.

13 Claims, 6 Drawing Sheets

(56) References Cited

U.S. PATENT DOCUMENTS

| | | |
|---|---|---|
| 2019/0006643 A1 | 1/2019 | Sakurai |
| 2019/0379018 A1 | 12/2019 | Varatharajah et al. |
| 2020/0203784 A1 | 6/2020 | Shimizu et al. |

FOREIGN PATENT DOCUMENTS

| | | | |
|---|---|---|---|
| CN | 108172731 A | * 6/2018 | ............ G08B 17/10 |
| DE | 19822059 A1 | 11/1999 | |
| EP | 2793289 A2 | 10/2014 | |
| JP | 2006-134800 A | 5/2006 | |
| JP | 2008282625 A | 11/2008 | |
| JP | 2009134901 A | 6/2009 | |
| JP | 2010272378 A | 12/2010 | |
| JP | 2011249309 A | 12/2011 | |
| JP | 201228321 A | 2/2012 | |
| JP | 2012248482 A | 12/2012 | |
| JP | 201389449 A | 5/2013 | |
| JP | 2013191422 A | 9/2013 | |
| JP | 2015520480 A | 7/2015 | |
| JP | 201863840 A | 4/2018 | |
| JP | 2018510465 A | 4/2018 | |
| JP | 201892699 A | 6/2018 | |
| JP | 2020-077482 A | 5/2020 | |
| JP | 2020126853 A | 8/2020 | |
| JP | 2020135920 A | 8/2020 | |
| WO | 2012133708 A1 | 10/2012 | |
| WO | 2012164730 A1 | 12/2012 | |
| WO | 2016071492 A1 | 5/2016 | |
| WO | 2019/151037 A1 | 8/2019 | |

* cited by examiner

POWER STORAGE DEVICE

This nonprovisional application is based on Japanese Patent Application No. 2020-175797 filed on Oct. 20, 2020 with the Japan Patent Office, the entire contents of which are hereby incorporated by reference.

BACKGROUND OF THE INVENTION

Field of the Invention

The present disclosure relates to a power storage device.

Description of the Background Art

A battery pack is an exemplary power storage device. Exemplary conventional battery pack structures are described in Japanese Patent Laying-Open No. 2010-272378 (PTL 1), Japanese Patent Laying-Open No. 2009-134901 (PTL 2), WO 2012/133708 (PTL 3), Japanese National Patent Publication No. 2015-520480 (PTL 4), and Japanese Patent Laying-Open No. 2012-28321 (PTL 5).

There is a demand for size reduction and weight reduction by simplifying a structure for restraining a plurality of battery cells. On the other hand, when such a restraining structure is simplified, precision in positioning the plurality of battery cells is decreased due to variation in deformation of the battery cells or the like, thus resulting in positional deviation of terminals of the battery cells.

Each of the structures described in PTL 1 to PTL 5 is not necessarily sufficient to solve the above-described problem. Further, a similar problem may occur in a power storage device other than the battery.

SUMMARY OF THE INVENTION

An object of the present disclosure is to provide a power storage device in which a plurality of power storage cells are precisely positioned.

A power storage device according to the present disclosure includes: a power storage module including a plurality of stacked power storage cells; and a case having an inner space to accommodate the power storage module. The case includes a main body provided with an opening on an electrode terminal side of the plurality of power storage cells, a cover provided over the opening, and a tapered portion that narrows a width of the inner space in a direction from the opening toward a lower side of the main body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. In the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

Figure 1:
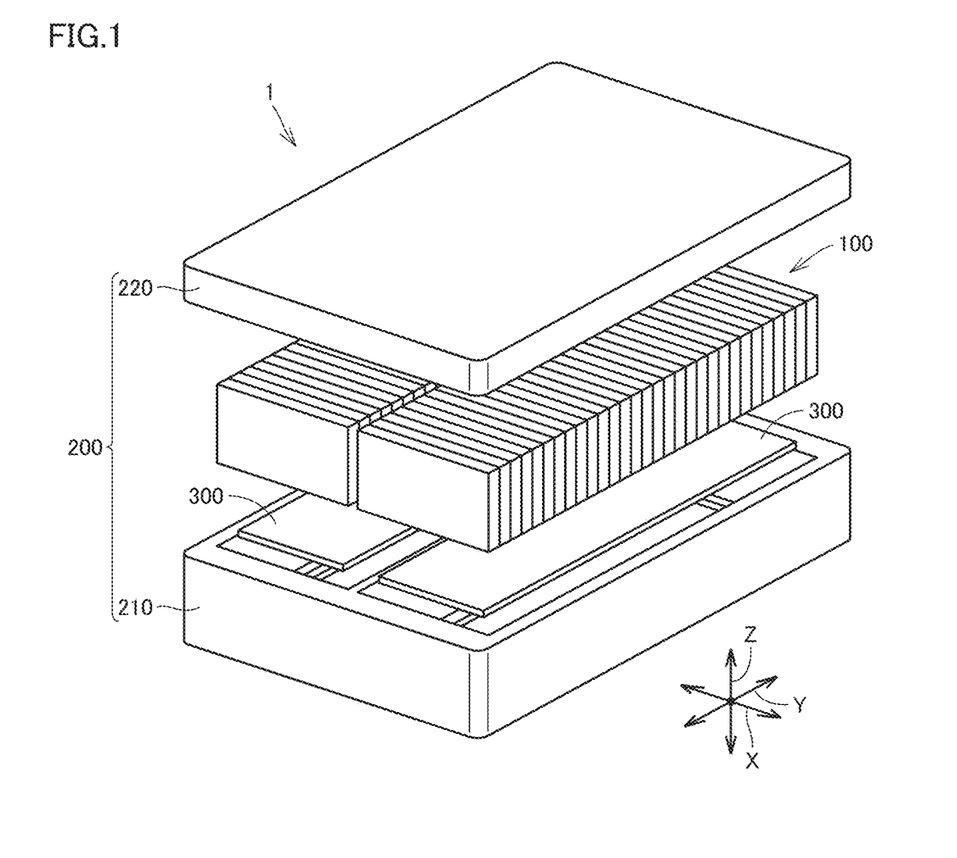
FIG. 1 is an exploded perspective view showing a configuration of a battery pack.

FIG. 1 is an exploded perspective view showing a configuration of a battery pack 1. Battery pack 1 includes battery modules 100, a case 200, and heat conducting members 300.

Each of battery modules 100 (power storage module) includes a plurality of battery cells (power storage cells) stacked along a Y axis direction (stacking direction).

Case 200 includes a case main body 210 and a cover member 220. Case main body 210 constitutes bottom surface and side surface of case 200. Cover member 220 constitutes a top surface of case 200. Case main body 210 is provided with an opening on the upper side (the electrode terminal 111 side shown in FIG. 2) with respect to the plurality of battery cells 110. Cover member 220 is provided over the opening of case main body 210.

Case 200 has an inner space to accommodate battery modules 100. Each of case main body 210 and cover member 220 may be a casted component (die cast material) composed of a metal material such as aluminum or magnesium, or may be a press-molded component composed of a carbon-containing material. Case 200 is not limited to the above configuration, and may be any case as long as case 200 satisfies predetermined characteristics such as strength, heat radiation, and thermal conductivity. For example, each of case main body 210 and cover member 220 may be composed of a resin.

A joining portion between case main body 210 and cover member 220 may be sealed using a sealing material such as a rubber, an adhesive agent, a hot-melt material, and the like, or case main body 210 and cover member 220 may be joined to each other by ultrasonic welding, laser welding, or the like. Thus, a sealed space is formed inside case 200 including case main body 210 and cover member 220.

Each of heat conducting members 300 is provided between battery module 100 and case main body 210 of case 200, and promotes transfer of heat generated in battery module 100 to case 200.

Battery pack 1 may be mounted on a vehicle. When battery pack 1 is mounted on a vehicle, cover member 220 is typically positioned on the upper side with respect to case main body 210. In the present specification, the Z axis direction may be referred to as "upward/downward direction", the case main body 210 side in the Z axis direction may be referred to as "lower side", and the cover member 220 side in the Z axis direction may be referred to as "upper side".

Figure 2:
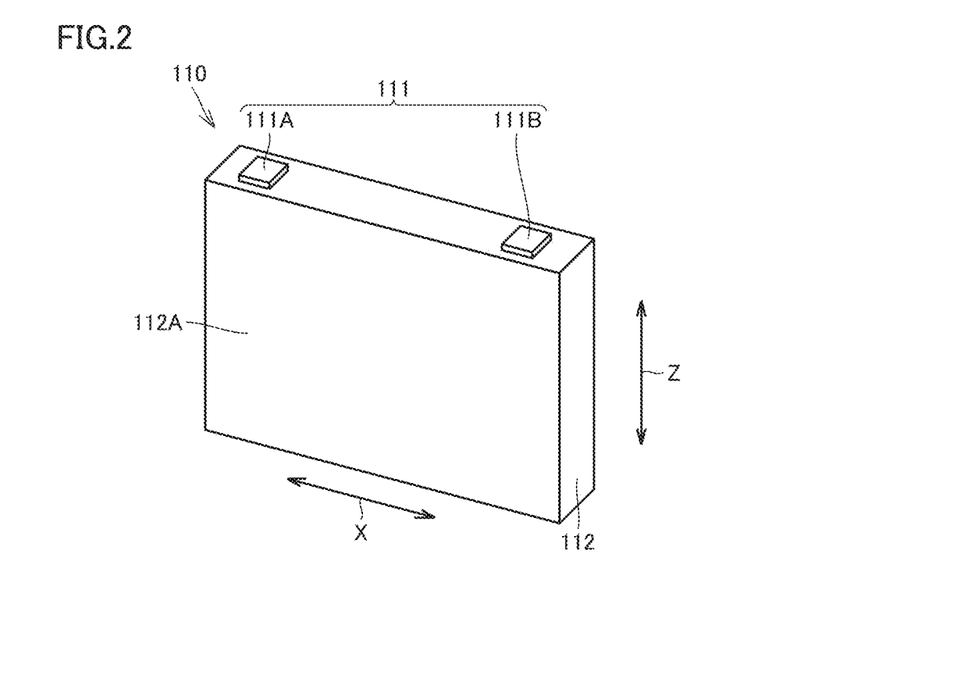
FIG. 2 is a diagram showing a battery cell included in a battery module.

FIG. 2 is a diagram showing battery cell 110 included in battery module 100. As shown in FIG. 2, battery cell 110 includes an electrode terminal 111 and an accommodation case 112 (housing). Electrode terminal 111 includes a positive electrode terminal 111A and a negative electrode terminal 111B. Electrode terminal 111 is formed on accommodation case 112. An electrode assembly and an electrolyte solution (not shown) are accommodated in accommodation case 112.

Accommodation case 112 is formed to have a flat rectangular parallelepiped shape. That is, battery cell 110 is a prismatic cell. Accommodation case 112 has a main surface 112A extending along an X-Z plane orthogonal to the Y axis direction.

As an example, battery cell 110 is a lithium ion battery. Battery cell 110 may be another battery such as a nickel-metal hydride battery. Further, in the present disclosure, the "power storage module" is not limited to battery module 100, and a capacitor may be used as the "power storage cell" instead of battery cell 110, for example.

Figure 3:
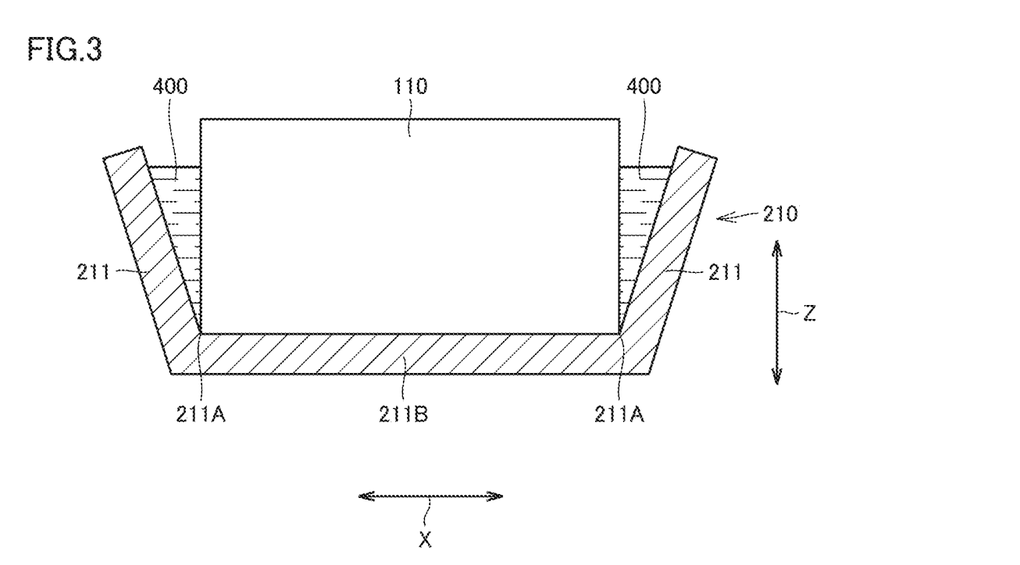
FIG. 3 is a first cross sectional view showing inside of a case of the battery pack.
Figure 4:
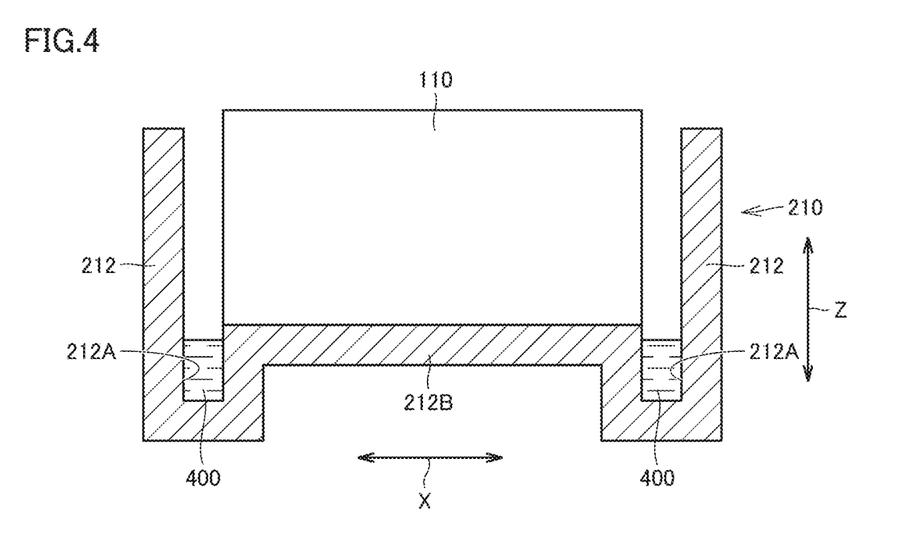
FIG. 4 is a second cross sectional view showing the inside of the case of the battery pack.

Each of FIGS. 3 and 4 is a cross sectional view showing the inside of the case of the battery pack. FIGS. 3 and 4 are cross sectional views in the X-Z plane direction, and show cross sections at different positions in the Y axis direction.

In the cross section shown in FIG. 3, case main body 210 includes tapered portions 211 that each narrow a width of the inner space in a direction from the opening toward a lower side of case main body 210. Each of tapered portions 211 is formed across a whole of case main body 210 in a height direction (Z axis direction) from the opening to a bottom surface of case main body 210. A bottom portion 211A of each tapered portion 211 is in abutment with a bottom surface corner portion of accommodation case 112 of battery cell 110. Tapered portions 211 are provided on both sides beside battery module 100 in the width direction of battery module 100.

In FIG. 3, for convenience of illustration and description, an inclination angle of each tapered portion 211 (inclination with respect to the Z axis direction) is shown to be slightly exaggerated, i.e., is shown to be larger than that in a typical embodiment. As an example, the inclination angle of tapered portion 211 is about 5°. However, the inclination angle of tapered portion 211 may be larger than 5°, and an inclination angle larger than the angle shown in FIG. 3 is not excluded from the scope of the present disclosure.

A clearance is formed between battery cell 110 and tapered portion 211 to have a width that becomes narrower in the direction toward the lower side of case main body 210. This clearance can function as a space of temporary storage for dew condensation water 400 in case 200.

By bringing the bottom surface corner portions of accommodation case 112 of battery cell 110 into abutment with bottom portions 211A of tapered portions 211, battery cell 110 can be precisely positioned in the X axis direction. The positioning in the Z axis direction is performed precisely by bottom surface 112C of battery cell 110 and the bottom surface of case 200 being brought into abutment with each other. As a result of the precise positioning in the X axis direction and the Z axis direction, unintended deformation of battery module 100 in which the plurality of battery cells 110 are stacked can be suppressed, thereby suppressing positional deviation of electrode terminals 111 of battery cells 110.

Although tapered portion 211 is formed in the form of a straight line in the example of FIG. 3, a portion or whole of the inner surface of tapered portion 211 may be formed in the form of a curved line. In either case, by the narrowest portion of tapered portion 211, battery cell 110 is positioned in the X axis direction.

In the cross section shown in FIG. 4, case main body 210 includes perpendicular portions 212 each separated from accommodation case 112 of battery cell 110 in the X axis direction. The inner surface of each perpendicular portion 212 extends along the upward/downward direction (Z axis direction) of case main body 210.

At perpendicular portions 212, recesses 212A are formed in the bottom surfaces of case main body 210 on both sides beside battery module 100 in the width direction of battery module 100. Each of recesses 212A can function as a space of temporary storage for dew condensation water 400 in case 200.

Figure 5:
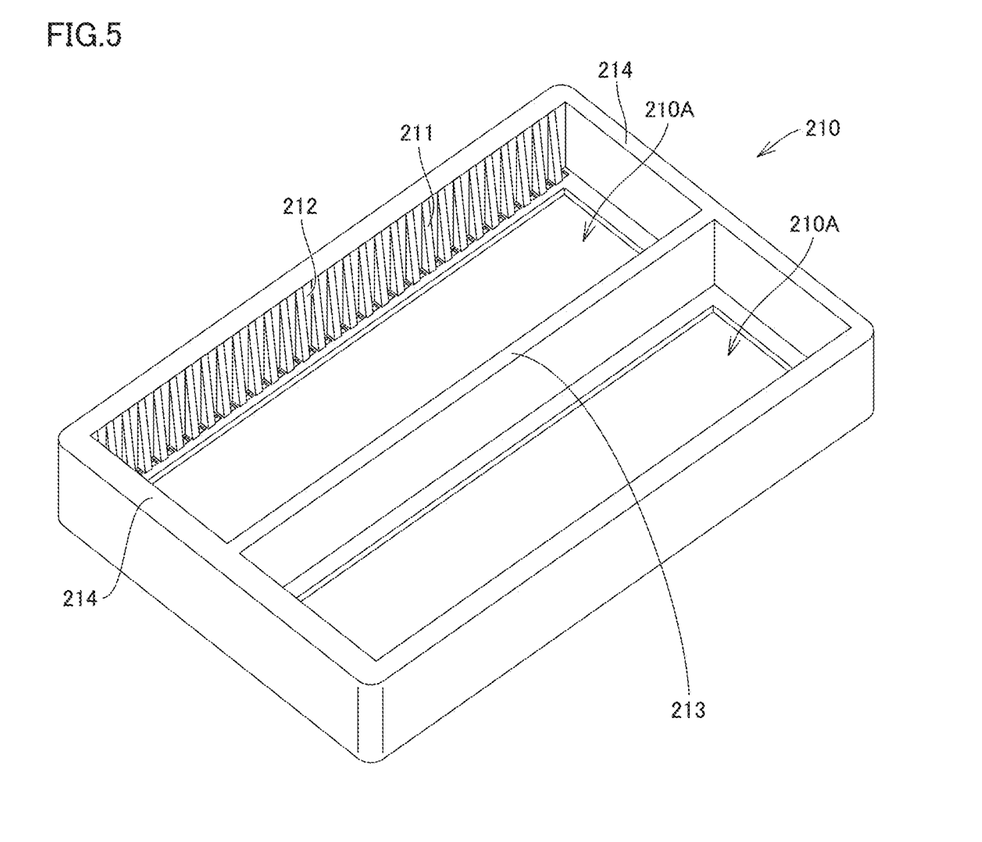
FIG. 5 is a perspective view showing the inside of the case of the battery pack.
Figure 6:
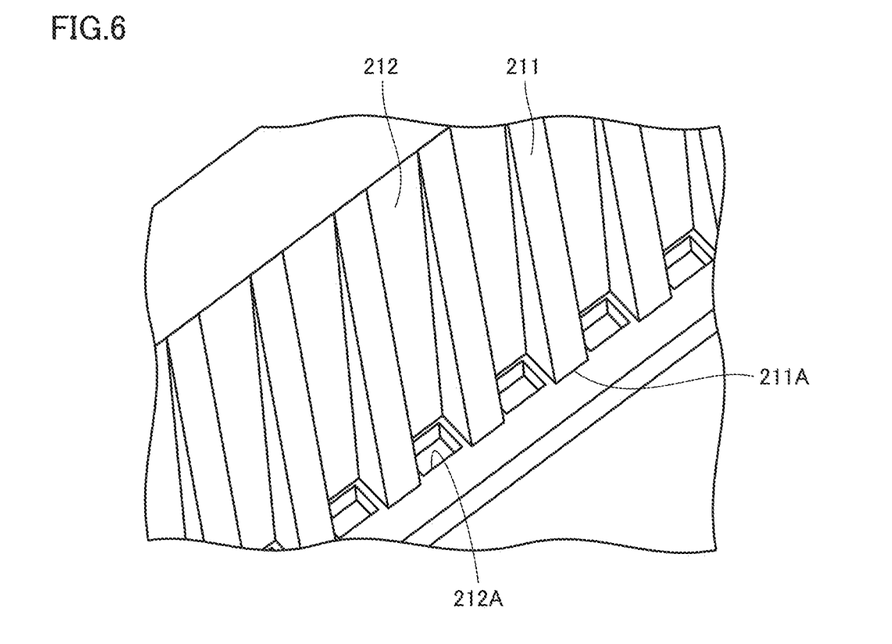
FIG. 6 is a partial enlarged view of the vicinity of a tapered portion shown in FIG. 5.

FIG. 5 is a perspective view showing the inside of case 200 of battery pack 1. FIG. 6 is a partial enlarged view of the vicinity of tapered portions 211 shown in FIG. 5. As shown in FIGS. 5 and 6, in case main body 210, tapered portions 211 and perpendicular portions 212 (non-tapered portions) are alternately formed along the stacking direction (Y axis direction) of battery cells 110. Here, when portions engageable with each other with the portions being movable relative to each other in the Z axis direction are provided between the inner surface of case main body 210 and the outer surface of accommodation case 112 of battery cell 110, insertion of battery module 100 into case main body 210 can be performed smoothly and positioning can be performed precisely.

It should be noted that each of FIGS. 3 and 4 shows the structure in which tapered portions 211 are provided on the both sides beside battery cell 110 in the X axis direction; however, in the example shown in FIG. 5, a space inside case main body 210 is divided into two accommodation spaces 210A by a central wall 213, and tapered portions 211 are provided only on one side in the width direction of battery module 100 in each accommodation space 210A.

As shown in FIG. 5, case main body 210 has supporting portions 214. Supporting portions 214 are provided at both end portions of case main body 210 in the Y axis direction. Supporting portions 211 are in direct abutment with main surfaces 112A of battery cells 110 located at both end portions of battery module 100 in the Y axis direction, so as to support battery module 100 along the Y axis direction.

Battery module 100 can be biased along the Y axis direction by each of supporting portions 214 itself being slightly deformed. The deformation may be facilitated in the Y axis direction by providing, for example, a cavity (not shown) in case main body 210 including supporting portion 214 so as to reduce the thickness of supporting portion 214.

When inserting battery module 100 into case main body 210, compression force is applied onto battery module 100 along the Y axis direction. On this occasion, battery module 100 can be compressed as a whole in the Y axis direction by, for example, providing a compressible material, together with a separator, between battery cells 110. When the compression force is gradually unloaded after battery module 100 is inserted into case main body 210, the length of compressed battery module 100 in the Y axis direction returns to its original length, with the result that battery module 100 presses the inner surface of case main body 210 in the Y axis direction. Reaction force against the pressing force serves as supporting force by which case main body 210 supports battery module 100.

During use of battery module 100, accommodation case 112 may be expanded due to a factor such as gasification of the electrolyte solution in accommodation case 112 of battery cell 110. Pressing force from battery module 100 to case main body 210 due to the expansion and reaction force thereagainst can also contribute to supporting of battery module 100 by case main body 210.

By bringing main surface 112A of battery cell 110 into direct abutment with case main body 210 for the sake of restraint in the Y axis direction, the plurality of battery cells 110 can be restrained in the Y axis direction without providing an end plate and a restraining member. As a result, the size of battery pack 1 can be reduced.

Further, by restraining battery module 100 by supporting portion 214 of case main body 210, each battery cell 110 can be precisely positioned in the Y axis direction.

Figure 7:
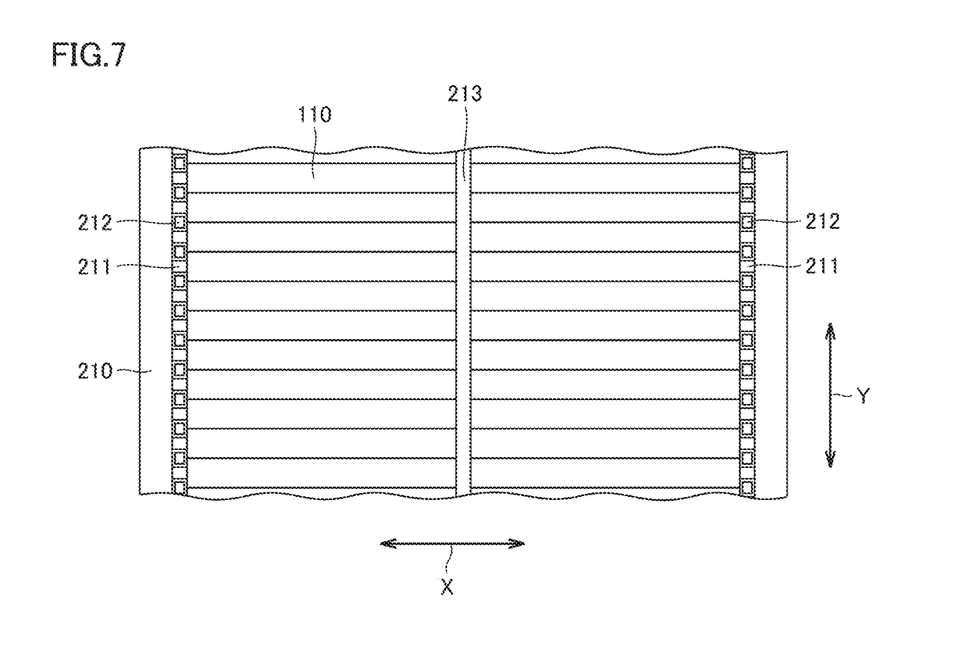
FIG. 7 is a diagram showing an arrangement of battery cells in the case.

FIG. 7 is a diagram showing an arrangement of battery cells 110 in case 200. As shown in FIG. 7, a tapered portion 211 is provided at a position corresponding to the center of each battery cell 110 in the stacking direction (Y axis direction). Thus, each battery cell 110 can be precisely positioned in the X axis direction.

Figure 8:
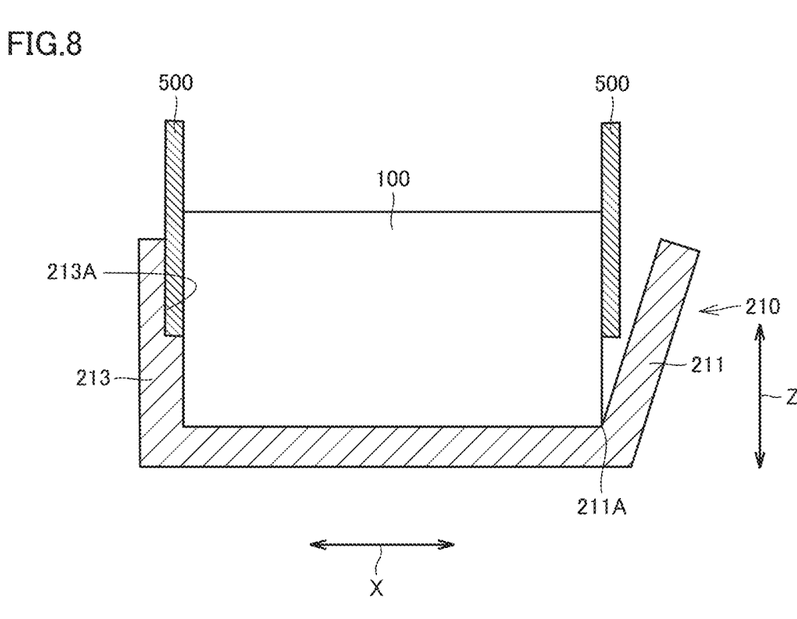
FIG. 8 is a diagram showing a step of inserting the battery module into the case according to one example.

FIG. 8 is a diagram showing a step of inserting battery module 100 into case 200. As shown in FIG. 8, battery module 100 is inserted into case main body 210 with battery module 100 being sandwiched by jigs 500 in the X axis direction. Respective jigs 500 are inserted into a clearance formed in tapered portion 211 and into a notch portion 213A formed in central wall 213.

When inserting battery cell 110 into case main body 210, the bottom surface corner portion of accommodation case 112 of battery cell 110 is brought into abutment with tapered portion 211. When battery cell 110 is completely inserted into case main body 210, the bottom surface corner portion of accommodation case 112 is brought into abutment with bottom portion 211A of tapered portion 211. Thus, battery cell 110 can be precisely positioned in the X axis direction and the Z axis direction.

In a state in which battery module 100 is sandwiched by jigs 500, battery module 100 may not be completely inserted into case main body 210, and when cover member 220 is pressed against case main body 210 to close case 200, battery module 100 may be pressed downward to bring the bottom surface corner portion of accommodation case 112 into abutment with bottom portion 211A of tapered portion 211.

Figure 9:
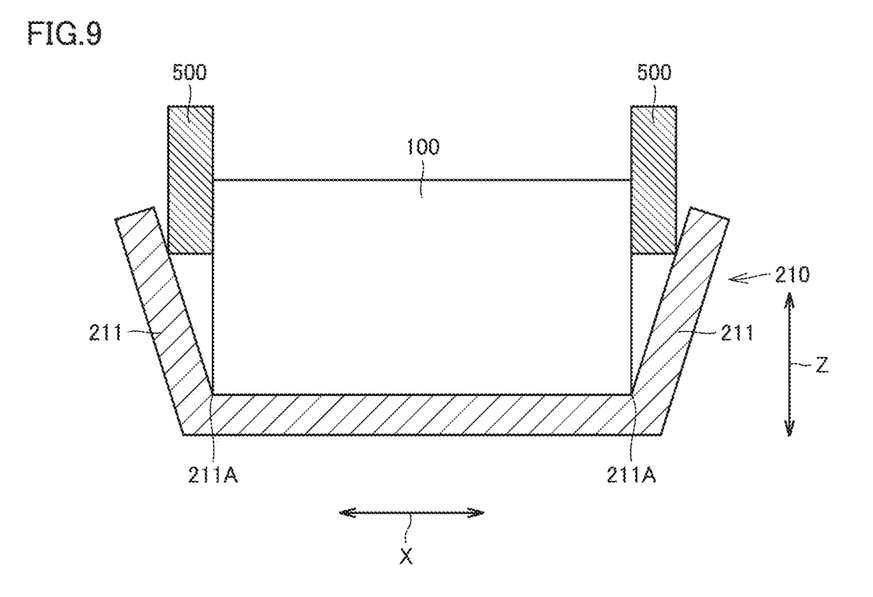
FIG. 9 is a diagram showing a step of inserting the battery module into the case according to one modification.

FIG. 9 is a diagram showing a step of inserting battery module 100 into case 200 according to one modification. As shown in FIG. 9, also in the case where tapered portions 211 are formed on both sides beside the battery module in the width direction (X axis direction) of the battery module, battery cell 110 can be precisely positioned in the X axis direction and the Z axis direction by bringing the bottom surface corner portion of accommodation case 112 into abutment with bottom portion 211A of tapered portion 211 when battery cell 110 is completely inserted into case main body 210 as in the case of FIG. 8.

Figure 10:
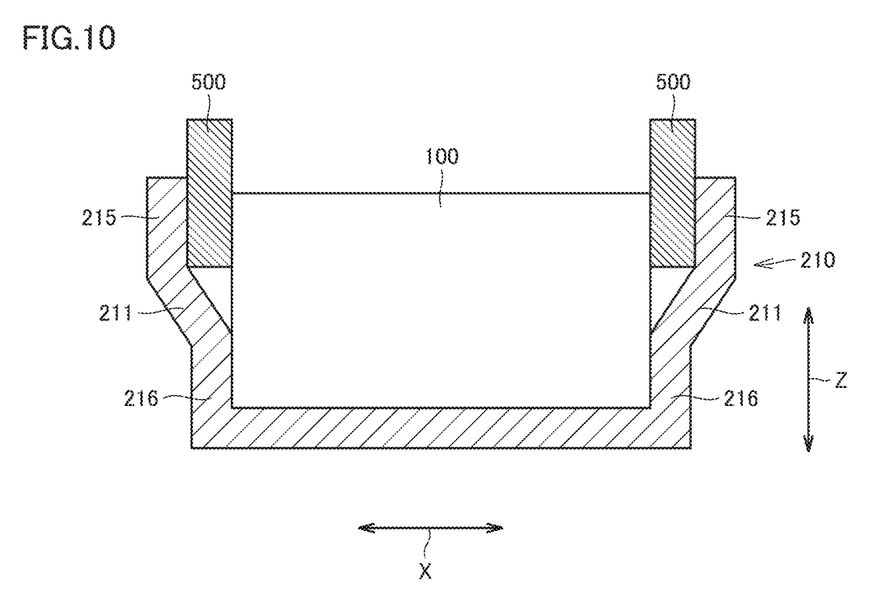
FIG. 10 is a diagram showing a step of inserting the battery module into the case according to another modification.

FIG. 10 is a diagram showing a step of inserting battery module 100 into case 200 according to another modification. As shown in FIG. 10, tapered portions 211 may be formed at portions of case main body 210 in the height direction (Z axis direction) from the opening to the bottom surface of case main body 210. In the example of FIG. 10, each of tapered portions 211 is formed at the central portion of case main body 210 in the height direction, and an upper portion 215 and a lower portion 216 are provided to sandwich tapered portion 211 therebetween from above and below. The inner surfaces of upper portion 215 and lower portion 216 are formed to extend in the Z axis direction.

Also in the example of FIG. 10, battery cell 110 is inserted into case main body 210 while bringing the bottom surface corner portion of accommodation case 112 of battery cell 110 into abutment with tapered portion 211. When battery cell 110 is completely inserted into case main body 210, the bottom surface corner portion of accommodation case 112 is brought into abutment with the bottom portion of lower portion 216. Thus, battery cell 110 can be precisely positioned in the X axis direction and the Z axis direction.

Further, in the structure of FIG. 10, since battery cell 110 in case main body 210 can be supported in a wider surface range by lower portion 216 in addition to bottom portion 211A of tapered portion 211, battery module 100 can be supported and positioned more securely even when external vibration is exerted onto battery pack 1.

Thus, according to battery pack 1 according to the present embodiment, battery cells 110 can be positioned precisely in the X axis direction, the Y axis direction, and the Z axis direction without decreasing workability.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A power storage device, comprising:
  a power storage module having a first direction and a second direction orthogonal to the first direction, the power storage module including a plurality of stacked power storage cells stacked along the first direction; and
  a case having an inner space to accommodate the power storage module, the inner space having a width extending along the second direction,
  wherein
  the case includes
    a main body provided with an opening on an electrode terminal side of the plurality of power storage cells,
    a cover provided over the opening,
    a plurality of tapered portions that narrows the width of the inner space in a height direction from the opening toward a bottom surface of the main body; and
    a non-tapered portion between two adjacent tapered portions among the plurality of tapered portions along the first direction,
  a recess is formed in the bottom surface of the main body and has a closed outer side wall defined by the non-tapered portion,
  each of the plurality of tapered portions is located at a position corresponding to a center of a corresponding power storage cell of the plurality of stacked power storage cells in the first direction, and
  the non-tapered portion straddles two adjacent power storage cells of the plurality of stacked power storage cells in the first direction.

2. The power storage device according to claim 1, wherein each of the plurality of power storage cells includes a housing having a prismatic shape, and
  a bottom portion of each of the plurality of tapered portions is in abutment with a bottom surface corner portion of the housing.

3. The power storage device according to claim 1, wherein the plurality of tapered portions is provided on each of two sides beside the power storage module in the second direction of the power storage module, the second direction of the power storage module being a width direction of the power storage module.

4. The power storage device according to claim 1, wherein
the case includes a plurality of non-tapered portions including said non-tapered portion, and
the plurality of tapered portions and the plurality of non-tapered portions are alternately formed along the first direction of the power storage module.

5. The power storage device according to claim 1, wherein the plurality of tapered portions is formed across a whole of the main body in the height direction from the opening to the bottom surface of the main body.

6. The power storage device according to claim 1, wherein the plurality of tapered portions is formed at a portion of the main body in the height direction from the opening to the bottom surface of the main body.

7. The power storage device according to claim 4, wherein the recess is formed on each of two sides beside the power storage module in the second direction of the power storage module, the second direction of the power storage module being a width direction of the power storage module.

8. The power storage device according to claim 1, wherein the case includes a supporting portion that supports the power storage module accommodated in the inner space, along the first direction of the power storage module.

9. The power storage device according to claim 1, wherein the plurality of power storage cells are lithium ion battery cells.

10. The power storage device according to claim 1, wherein the recess has a horizontal bottom surface and defines a space configured to store dew condensation water in the case.

11. The power storage device according to claim 1, wherein
the recess further includes a closed inner side wall opposite to the closed outer side wall in the second direction of the power storage module, and
the closed inner side wall of the recess is aligned with an outer surface of the plurality of stacked power storage cells in a height direction from the opening to the bottom surface of the main body.

12. The power storage device according to claim 1, wherein an entirety of the recess is located on an outer side of the plurality of stacked power storage cells in the second direction of the power storage module.

13. The power storage device according to claim 1, wherein each of the plurality of stacked power storage cells is a prismatic cell.

* * * * *